(12) United States Patent
Filippini et al.

(10) Patent No.: US 12,146,557 B2
(45) Date of Patent: Nov. 19, 2024

(54) DIFFERENTIAL AND VEHICLE COMPRISING SUCH DIFFERENTIAL

(71) Applicant: UNIVERSITA' DEGLI STUDI DI PADOVA, Padua (IT)

(72) Inventors: Mattia Filippini, Padua (IT); Piergiorgio Alotto, Padua (IT); Maurizio Repetto, Turin (IT); Elvio Bonisoli, Turin (IT); Vincenzo Cirimele, Turin (IT)

(73) Assignee: EuroGroup Laminations S.p.A., Baranzate (IT)

( * ) Notice: Subject to any disclaimer, the term of this patent is extended or adjusted under 35 U.S.C. 154(b) by 0 days.

(21) Appl. No.: 17/297,861

(22) PCT Filed: Nov. 28, 2019

(86) PCT No.: PCT/IB2019/060284
§ 371 (c)(1),
(2) Date: May 27, 2021

(87) PCT Pub. No.: WO2020/110064
PCT Pub. Date: Jun. 4, 2020

(65) Prior Publication Data
US 2022/0018427 A1 Jan. 20, 2022

(30) Foreign Application Priority Data
Nov. 28, 2018 (IT) .................. 102018000010648

(51) Int. Cl.
*F16H 48/34* (2012.01)
*F16H 48/08* (2006.01)
*H02K 49/10* (2006.01)

(52) U.S. Cl.
CPC ............. *F16H 48/34* (2013.01); *F16H 48/08* (2013.01); *F16H 2048/343* (2013.01); *H02K 49/102* (2013.01)

(58) Field of Classification Search
CPC ........................... H02K 49/102; H02K 51/00
See application file for complete search history.

(56) References Cited

U.S. PATENT DOCUMENTS

| 1,333,415 A | 3/1920 | David |
| 6,083,133 A * | 7/2000 | Dye ...................... F16H 48/08 475/230 |

(Continued)

FOREIGN PATENT DOCUMENTS

| CN | 105822743 A | 8/2016 | |
| CN | 109027176 A * | 12/2018 | ............. F16H 48/08 |

(Continued)

OTHER PUBLICATIONS

International Search Report, issued in PCT/IB2019/060284, mailed Feb. 14, 2020, Rijswijk, Netherlands.

(Continued)

*Primary Examiner* — Stacey A Fluhart
*Assistant Examiner* — James J Taylor, II
(74) *Attorney, Agent, or Firm* — Ferguson Case Orr Paterson

(57) ABSTRACT

A differential includes two magnetic gears each having an internal rotor, an external rotor, and a rotor of the ferromagnetic poles interposed between the internal and the external rotors. The internal rotor, the external rotor and the rotor of the ferromagnetic pole are coaxial and rotate about a gear axis. The internal rotors are connected to a drive, to be placed in rotation about a respective gear axis by the drive. With external rotors suitable for being connected to respective output semi-axes for placing them in rotation, the rotors (Continued)

of the ferromagnetic poles are connected to adjustment means suitable for adjusting the rotation speed of the rotors of the ferromagnetic poles. With external rotors connected to adjustment means suitable for adjusting their rotation speed, the rotors of the ferromagnetic poles are connected to respective output semi-axes for placing them in rotation.

12 Claims, 7 Drawing Sheets

(56) References Cited

U.S. PATENT DOCUMENTS

| | | | |
|---|---|---|---|
| 6,762,524 B2 | 7/2004 | Six | |
| 8,138,652 B2 * | 3/2012 | Davis | H02K 11/048 310/168 |
| 8,177,007 B2 * | 5/2012 | Abe | F16H 48/36 180/65.265 |
| 10,697,528 B2 * | 6/2020 | Chu | B62D 11/16 |
| 11,231,097 B2 * | 1/2022 | Lang | F16H 48/36 |
| 2005/0209761 A1 | 9/2005 | Elie et al. | |
| 2008/0030090 A1 | 2/2008 | Abe et al. | |
| 2014/0183996 A1 | 7/2014 | He et al. | |

FOREIGN PATENT DOCUMENTS

| | | |
|---|---|---|
| JP | F104358927 A | 12/1992 |
| JP | 2002225581 A | 8/2002 |

OTHER PUBLICATIONS

Written Opinion, issued in PCT/IB2019/060284, mailed Feb. 14, 2020.

* cited by examiner

DIFFERENTIAL AND VEHICLE COMPRISING SUCH DIFFERENTIAL

CROSS-REFERENCE TO RELATED APPLICATIONS

This application is a National Phase Application of PCT International Application No. PCT/IB2019/060284, having an International Filing Date of Nov. 28, 2019 which claims the benefit of priority to Italian Patent Application No. 102018000010648, filed Nov. 28, 2018, each of which is hereby incorporated by reference in its entirety.

FIELD OF THE INVENTION

The present invention relates to a magnetic differential. In particular, the present invention relates to a magnetic differential for example for vehicular use. The term vehicle means a mechanical means arranged with wheels, for example four, which may be a car, a railway carriage, or other similar vehicles, without any limitation to the type of vehicle to which the principles of the present invention can be applied, as will be apparent from the present description.

BACKGROUND OF THE INVENTION

As known, the differential is a mechanical member that transfers the longitudinal motion coming from a drive shaft to the wheels. In particular, the differential allows the wheels to have a different angular velocity to travel, for example, curvilinear trajectories, distributing the torque according to a dynamic law dependent on geometry. In essence, the differential allows the wheels to turn on the same axis at different speeds, making the wheel inside the bend turn at a lower speed than the wheel outside the bend.

In its most general form, the mechanical differential comprises:
  a crown, mounted between the semi-axes, and suitable for meshing with a pinion fitted on a crankshaft;
  a satellite holder cage, integral with the crown;
  inside the satellite holder cage two pins are fixed on which are installed two satellites (coaxial conical toothed wheels) which are free to rotate and mesh with two planetary gears (coaxial conical toothed wheels) integral with the drive shafts.

During the rectilinear motion, the pinion transmits the motion to the crown which, in turn, by turning the satellite holder cage, transmits an equal number of revolutions to the planetary gears. The two satellites provide the system with an additional degree of freedom since, if rotated, they allow the planetary gears and therefore the drive shafts to which the wheels are connected, to turn at different speeds.

Various types of differential are known in the prior art.

For example, blocking versions are known, in which it is possible to block the action of the differential, imposing the same rotation on the two drive shafts. When the grip of the wheels on the road surface decreases, the differential block allows blocking the slip of the wheel with less grip, distributing traction on both wheels.

Although the solutions of the prior art are widely used, they are not without drawbacks.

For example, being a gear with lubrication, it may be subject to loss or deterioration of lubricant. It is therefore necessary to provide for maintenance and possibly to top up the lubricant or even to replace the seals.

In some applications, ordinary or extraordinary maintenance operations are not always possible or easy, for example the case of vehicles for the exploration of areas with little or no access, such as vehicles destined for the exploration of other planets.

Furthermore, the lubricant normally used tends to thicken at low temperatures.

The use of magnetic gears is known in the prior art which, not having mechanical parts meshing with each other, do not require lubrication like mechanical differentials.

Some examples of systems that use magnetic gears are described for example in U.S. Pat. Nos. 1,333,415, 6,762,524, US 2014/0183996, US 2008/0030090, and US 2005/0209761.

Some solutions only have transmissions that use magnetic gears as torque limiters: in this case, the magnetic coupling has a unit ratio and in case of excessive torque the operation becomes asynchronous.

In this discussion, a magnetic gear means a magneto-mechanical device capable of transmitting motion between different parts at different rotation speeds by exploiting the interaction between permanent magnets and ferromagnetic materials. In particular, a magnetic gear consists of three parts called an internal rotor, an external rotor and a third concentric rotating element with respect to the previous ones, indicated as a modulator. Arrays of permanent magnets are mounted on the internal and external rotors according to different configurations and directions of magnetization.

Generally, the internal rotor is the so-called fast rotor and the external rotor is the so-called slow rotor, however one could construct a gear with slow internal rotor and fast external rotor.

The intermediate rotor, called modulator or rotor of the ferromagnetic poles, consists of a series of poles in ferromagnetic material which are indispensable to give rise to an electromechanical interaction between the magnets on the internal rotor and those placed on the external rotor. The number and shape of ferromagnetic magnets and poles can vary according to the reduction ratio and rotation speed of the various rotors.

Depending on the specific application, one of the three rotors can be operated in stationary conditions, leaving the remaining rotors free to rotate instead.

As an example, suppose a coaxial magnetic gear composed of:
  an internal rotor with number of polar pairs Pi due to $2 \cdot P_i$ permanent magnets;
  an external rotor with number of polar pairs Po due to $2 \cdot P_o$ permanent magnets, and
  a modulator with a number of ferromagnetic poles q separated by a number q of air regions.

The magnetic fields produced by the internal and external rotors with periodicity $P_i$ and $P_o$ are modulated by the action of the ferromagnetic poles and in this way, it is possible, through appropriate choices of the parameters $P_i$, $P_o$ and q, to obtain the contributions of torque at non-null mean on the rotors when the rotation speeds of the components satisfy a determined kinematic equation function of $P_i$, $P_o$ and q. The maximum interaction is obtained by imposing $q=P_i+P_o$, and the rotation speeds satisfy the relation:

$$\omega_{out} = -P_i/P_o \cdot \omega_{in} + q/P_o \cdot \omega_{poles}$$

where $\omega_{in}$, $\omega_{out}$ and $\omega_{poles}$ represent the rotational speeds of the internal, external and ferromagnetic poles.

Assuming the rotor of the ferromagnetic poles as fixed ($\omega_{poles}=0$), the gear reduction ratio is $k=-P_i/P_o$ therefore, by choosing a number of poles $P_i$ and $P_o$ different from each other, a contribution is obtained of torque with non-zero mean in a period of rotation for the internal and external rotors which, in the case of gear units with unitary efficiency, results in $T_{in}=P_i/P_o \cdot T_{out}$, where $T_{in}$ and $T_{out}$ are the electromagnetic pairs developed respectively on the internal and external rotors.

In particular, with reference to the magnetic gear 30 shown in FIG. 7, the case of a magnetic gear with internal rotor 32, modulator 36 and external rotor 34 is shown. With reference to the above definitions of the parameters $P_i$, $P_o$ and q, in the gear of FIG. 7 we have: $P_i=5$, $P_o=13$, q=18. Considering that the rotor of the ferromagnetic poles is fixed, the reduction ratio between internal and external gear is $k=-P_i/P_o=-5/13=-6,385$, therefore a complete rotation (360 degrees) of the rotor corresponds to 6.385 complete rotations of the internal rotor.

The same ratio k coincides with the ratio of the mean values of the torques acting in steady state on the two rotors in the hypothesis of unitary efficiency: $T_{out}=6.385 \cdot T_{in}$.

If a prime motor is connected to the internal rotor (fast) and considering the actual non-unitary efficiency ($\eta<1$) of the device, the output torque is $T_{out}<6.385 \cdot T_{in}$.

The ratio between the axle torques being known, it should be emphasized that the transmissible torque between the two rotating axes is limited to a maximum value. Once the topology and geometry of the system are known, this value can be calculated using electromagnetic simulations, depending on the relative positions of the mobile magnetic gear parts.

As a result, in some types of differential, the magnetic couplings are used as clutches since their behavior in the case of exceeding the torque limit mentioned above, which involves an asynchronous operation of the device or in which the speeds $\omega_{in}$ and $\omega_{out}$ are no longer in ratio k with null mean torque resultant, is well known. Some types of differential with magnetic gears use three or more interconnected magnetic systems with multiple shafts. These are devices whose practical implementation, although possible, is extremely complex. However, the prior art systems use the so-called PDD (Pseudo Direct Drive) solutions, i.e. electric motors with an integrated magnetic gear and therefore with the need for windings that must be powered.

In some applications where asynchronous operation between two semi-axes is required, a magnetic gear is commonly used for each semi-axis coupled to its own drive motor. This solution, although applicable, is complex and expensive, given the presence of at least two drive motors.

SUMMARY OF THE INVENTION

The need to solve the drawbacks and limitations mentioned with reference to the prior art is therefore felt.

Therefore, the need is felt to provide a differential which uses magnetic gears but which is simpler from the constructive point of view than the differentials of the prior art.

Furthermore, the need is felt for a magnetic differential that allows locking in analogy with the mechanical differential.

Furthermore, the need is felt for a differential that can be used without temperature limitations.

Furthermore, the need is felt for a differential that can be used in particularly extreme conditions that do not allow the possibility of intervening for maintenance.

Furthermore, the need is felt for a magnetic differential that can operate without the need for electrical windings and dedicated power supplies.

Moreover, the need is felt for a magnetic differential in which the vibrations linked to the operation are reduced with respect to the differentials of the prior art.

Such a need is met by a differential and a vehicle comprising such differential as described and claimed herein.

DESCRIPTION OF THE DRAWINGS

Further features and advantages of the present invention will appear more clearly from the following description of preferred non-limiting embodiments thereof, in which.

Elements or parts of elements in common to the embodiments described below are referred to with the same reference numerals.

DETAILED DESCRIPTION

Figure 1:
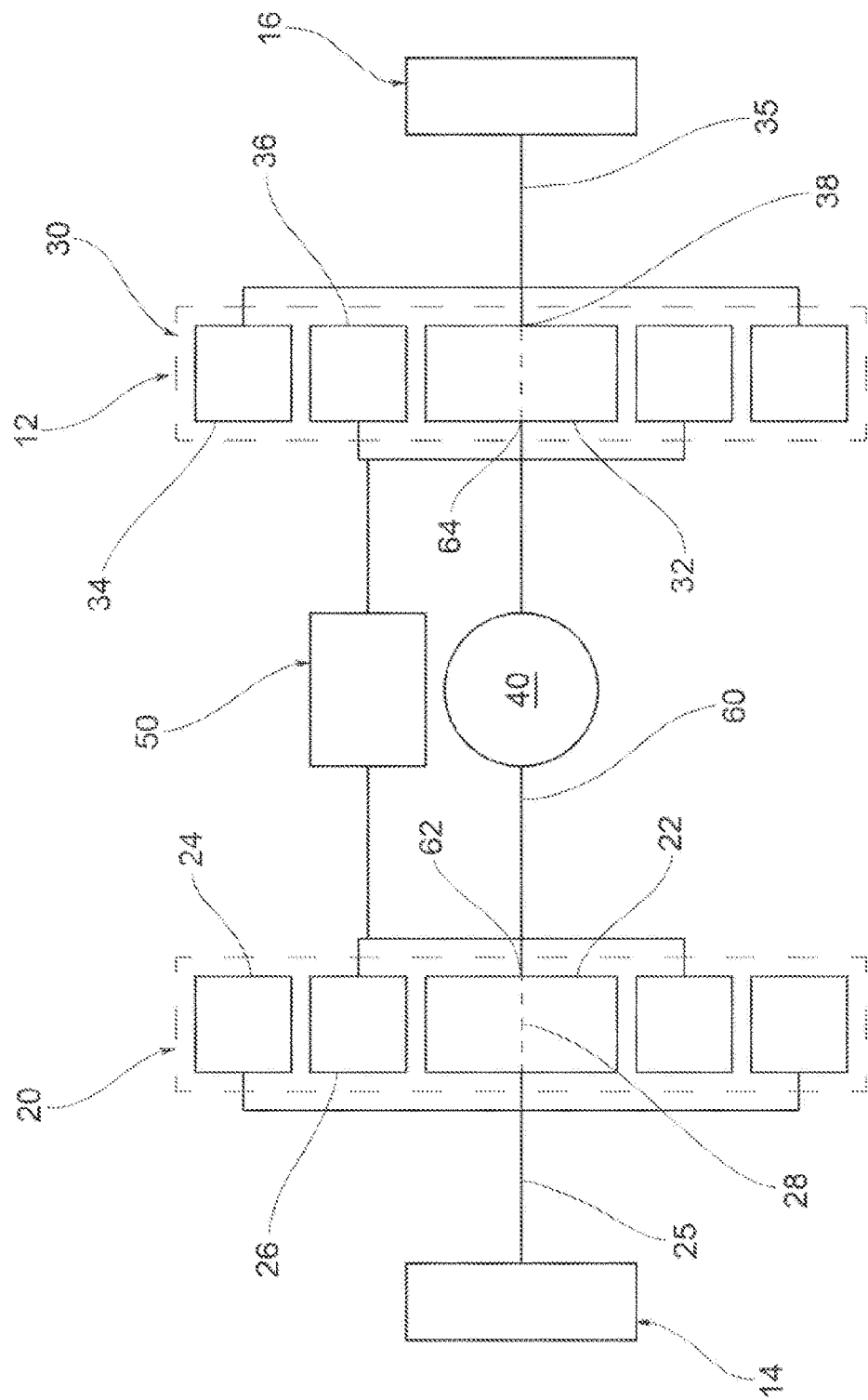
FIG. 1 schematically shows a simplified representation of a differential for a vehicle according to the present invention.

FIG. 1 shows a differential, in particular a differential for a vehicle, according to the present invention, indicated in a general manner with reference numeral 12.

The differential 12 comprises two magnetic gears 20, 30, each comprising:

an internal rotor 22, 32, an external rotor 24, 34, and a rotor of the ferromagnetic poles 26, 36 interposed between the internal rotor 22, 32 and the external rotor 24, 34.

The internal rotor 22, 32, the external rotor 24, 34 and the ferromagnetic pole rotor 26, 36 are coaxial and suitable to rotate about a gear axis 28, 38.

The internal rotors 22, 32 are suitable for being connected to a drive 40, to be placed in rotation about the respective gear axis 28, 38 by the drive 40.

According to a first embodiment shown in FIG. 1, the external rotors 24, 34 are suitable to be connected to respective output semi-axes 25, 35 for placing them in rotation, the rotors of the ferromagnetic poles 26, 36 are connected to adjustment means 50 suitable to adjust the rotation speed of the rotors of the ferromagnetic poles 26, 36.

Figure 2:
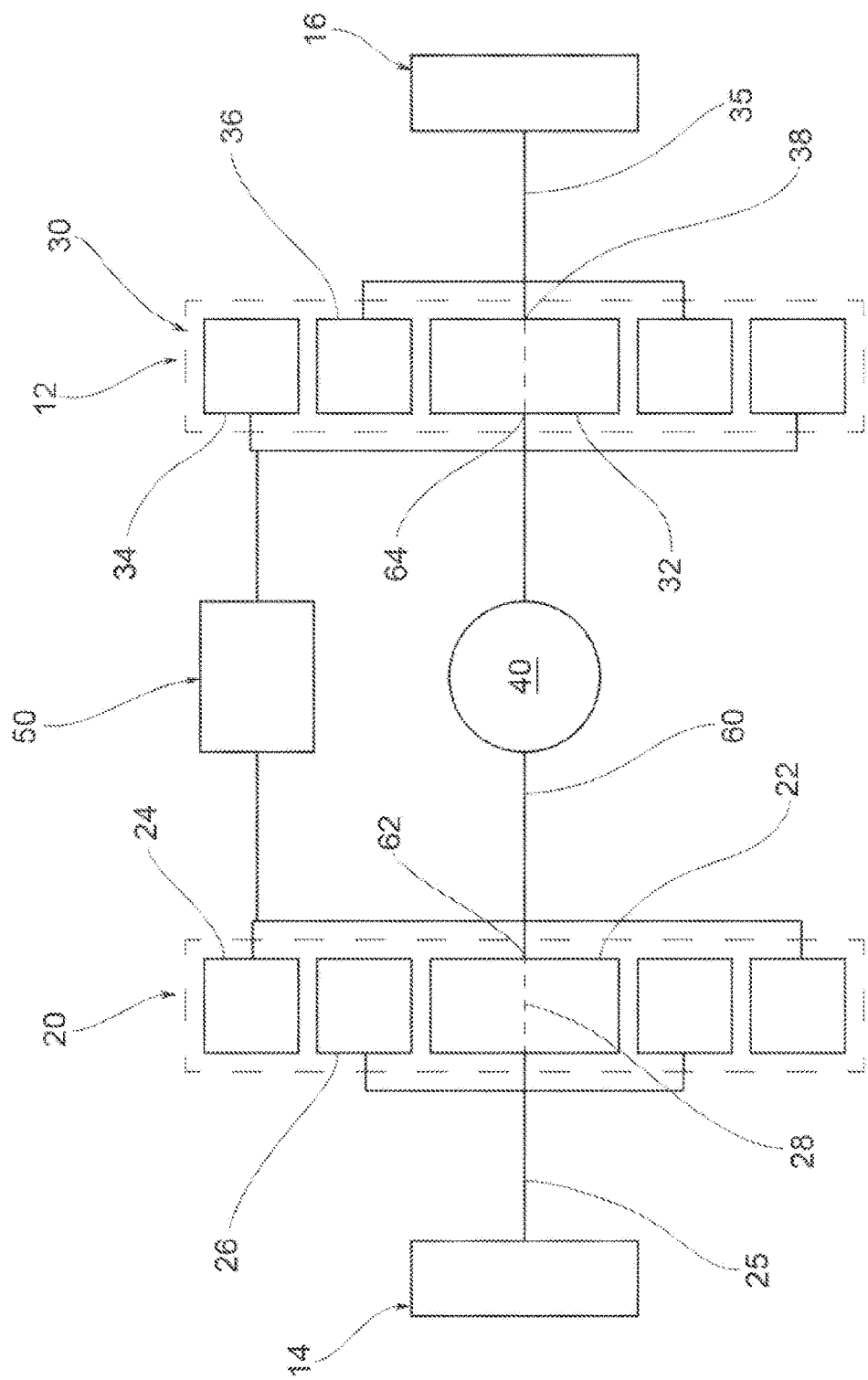
FIG. 2 schematically shows a simplified representation of an alternative embodiment of the present invention.

According to an alternative embodiment shown in FIG. 2, the external rotors 24, 34 are connected to the adjustment means 50 suitable for adjusting their rotation speed, and the rotors of the ferromagnetic poles are suitable to be connected to respective output semi-axes 25, 35 to place them in rotation.

According to an embodiment, the magnetic gears 20, 30 may be coaxial.

The differential 12 may be adapted to be arranged in a vehicle. In this application, the output semi-axes 25, 35 are connected to wheels 14, 16 of the vehicle. The magnetic gears 20, 30 can be arranged in an intermediate position between the wheels 14, 16.

Figure 5:
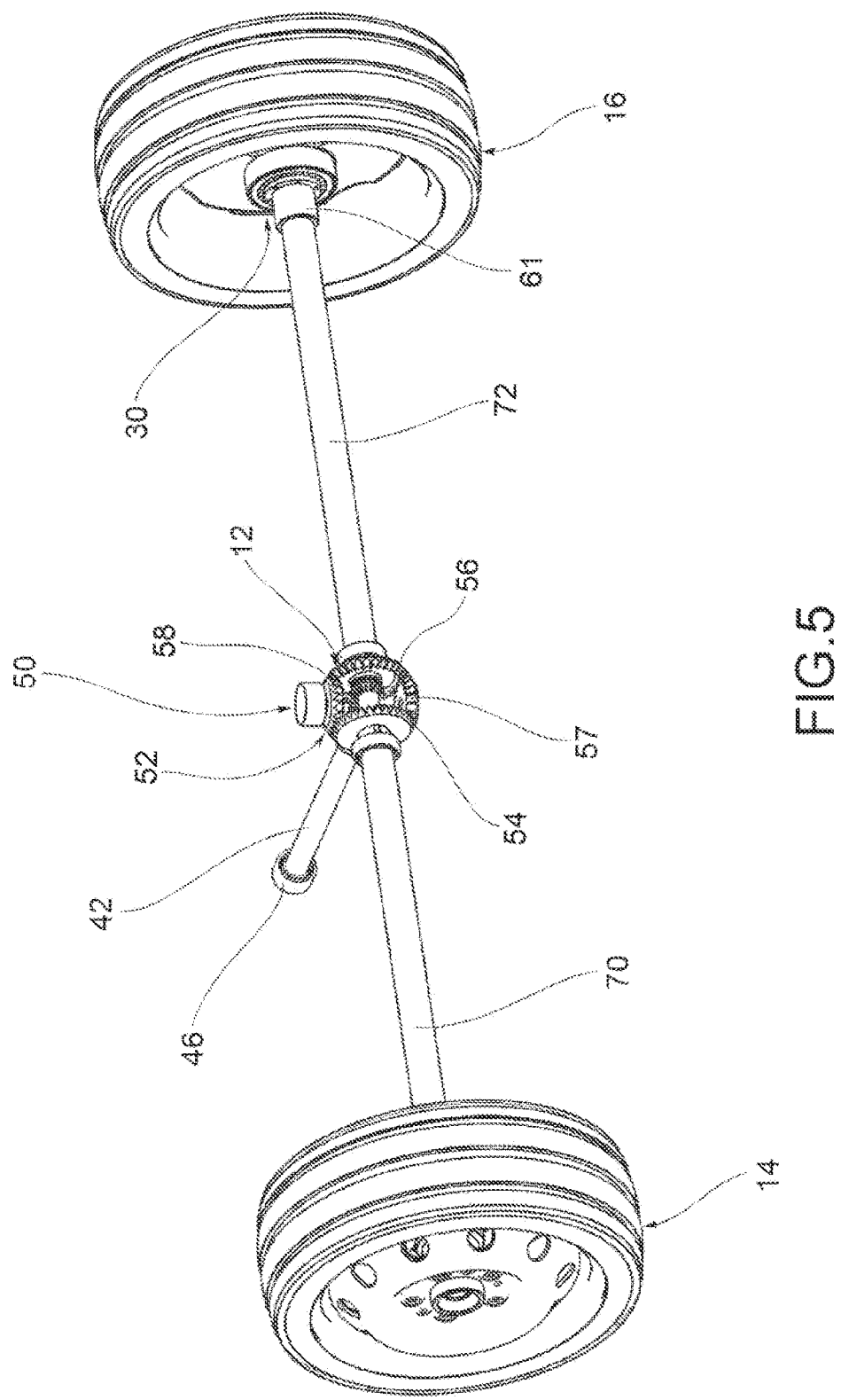
FIG. 5 schematically shows a perspective view of a differential for a vehicle according to the present invention connected to two wheels of a vehicle.

For example, as shown in the embodiment of FIG. 5, the magnetic gears 20, 30 can be placed in the proximity of the wheels 14, 16 of the vehicle.

In the following description, particular reference will be made to the embodiment shown in FIG. 1. As will be apparent to the man skilled in the art, the principles of the present invention will apply mutatis mutandis also to the embodiment shown in FIG. 2.

The adjustment means 50 can comprise a connecting gear 52 having a first gear wheel 54 integral in rotation with the rotor of the ferromagnetic poles 26 of a magnetic gear 20, and a second gear wheel 56 integral in rotation with the rotor of the ferromagnetic poles 36 of the other magnetic gear 30. The connecting gear 52 has a transmission ratio −1 between the first gear wheel 54 and the second gear wheel 56.

By the expression "integral in rotation" it is meant that the gear wheel 54, 56 is suitable to be rotated by the respective rotor of the ferromagnetic poles 26, 36. In particular, each ferromagnetic pole rotor can be keyed onto the same shaft of the respective gear wheel 54, 56, as will be explained below.

According to a possible embodiment of the present invention, the first gear wheel 54 and the second gear wheel 56 are conical. The connecting gear 52 further comprises a conical adjustment gear wheel 58 interposed between and meshing with the first gear wheel 54 and the second gear wheel 56. As shown in the schematic representation of FIG. 4, the conical adjustment gear wheel 58 can be keyed onto an adjustment shaft 59.

According to a possible embodiment of the present invention, the connecting gear 52 can comprise a further conical wheel 57, interposed between the wheels 54, 56, having an axis of rotation coinciding with the rotation axis of the conical adjustment gear wheel 58.

In alternative embodiments, not shown in the accompanying figures, the connecting gear 52 can be made with cylindrical gear wheels.

According to a possible embodiment of the present invention, the adjustment means can comprise for example pulleys with belts, transmission chains or other solutions.

According to a possible embodiment of the present invention, the adjustment means 50 comprise a device 51 suitable for increasing and/or decreasing the rotation speed of said conical adjustment gear wheel 58.

For example, the device 51 adapted to decrease the rotation speed of the conical adjustment gear wheel 58 may be a brake. The brake can be, for example, a disc brake, a drum brake, etc.

Alternatively, the device 51 adapted to decrease and/or increase the rotation speed of the conical adjustment gear wheel 58 may be a drive motor. The drive motor can be, for example, electric (synchronous with permanent magnets, asynchronous, reluctance), internal combustion, etc., based on specific applications or adjustment possibilities.

Advantageously, the adjustment means 50 can comprise sensors adapted to detect particular operating conditions of the magnetic gears. These sensors are used to determine the kinematic conditions of operation of the device. The sensors can be, for example, optical encoders, magnetic encoders or tachometer dynamos.

According to a possible embodiment of the present invention, the adjustment means 50 can comprise a programmable control unit (not shown) adapted to regulate the operation of the device 51 adapted to increase and/or decrease the rotation speed of the conical adjustment gear wheel 58, based on the information provided by the sensors.

According to an embodiment of the present invention, the differential 12 comprises an internal rotor shaft 60 having a first end 62 and a second end 64. The internal rotors 22, 32 are keyed at the ends. Moreover, in an intermediate position between the first and second ends 62, 64, coupling means 66 are arranged with the motor drive 40, which are adapted to transfer the rotational motion of a motor shaft 42 of the motor drive 40 to the internal rotor shaft 60. The motor shaft 42 can be arranged on support bearings 46.

According to a possible embodiment of the present invention, the coupling means 66 can comprise a pinion 44 keyed on the motor shaft 42 and a respective conical gear wheel 68 keyed onto the internal rotor shaft 60.

According to a possible embodiment, the internal rotor shaft 60 can be hollow.

The drive motor 40 can be for example an internal combustion engine, an electric motor, or a hybrid engine, comprising an output motor shaft 42.

According to a possible embodiment of the present invention, the differential 12 comprises a first and a second shaft of the rotors of the ferromagnetic poles 70, 72, each having a rotor of the ferromagnetic poles 26, 36 keyed at one end and at a second end a gear wheel 54, 56 of the connecting gear 52.

Figure 6:
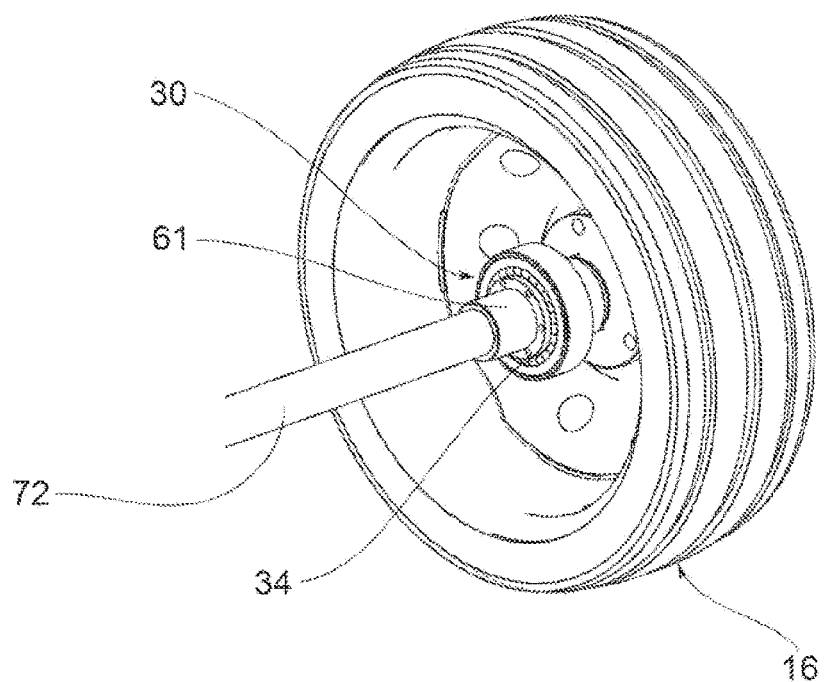
FIG. 6 shows an enlarged detail of FIG. 5 in the proximity of a wheel.
Figure 7:
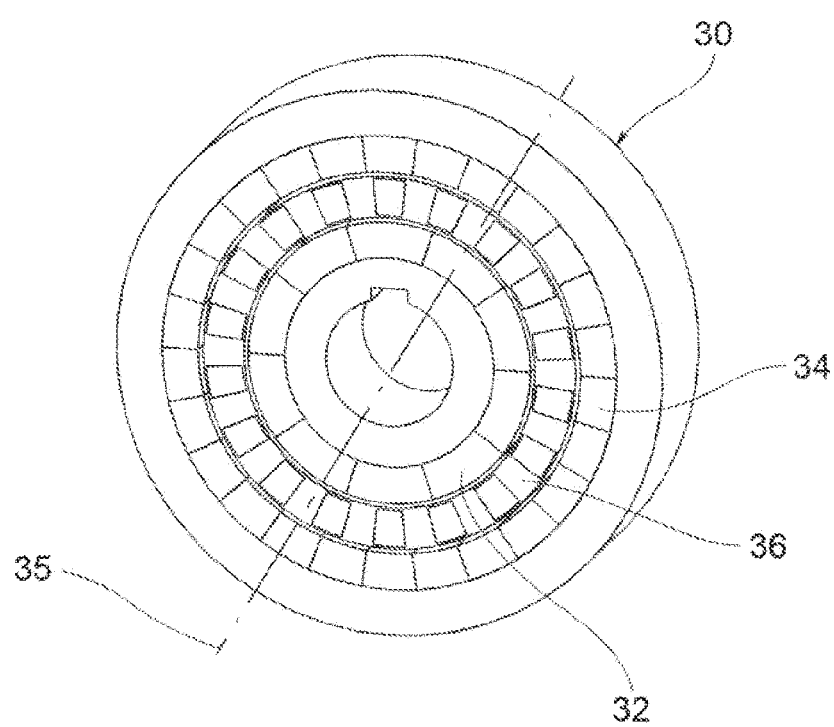
FIG. 7 schematically shows a detail of a differential for a vehicle according to the present invention.

According to a possible embodiment of the present invention, the rotor of the ferromagnetic poles 26, 36 can be keyed onto the respective shaft 70, 72 in a manner known per se, for example by means of connecting flanges 61, as shown in the schematic example of FIG. 6.

Figure 9:
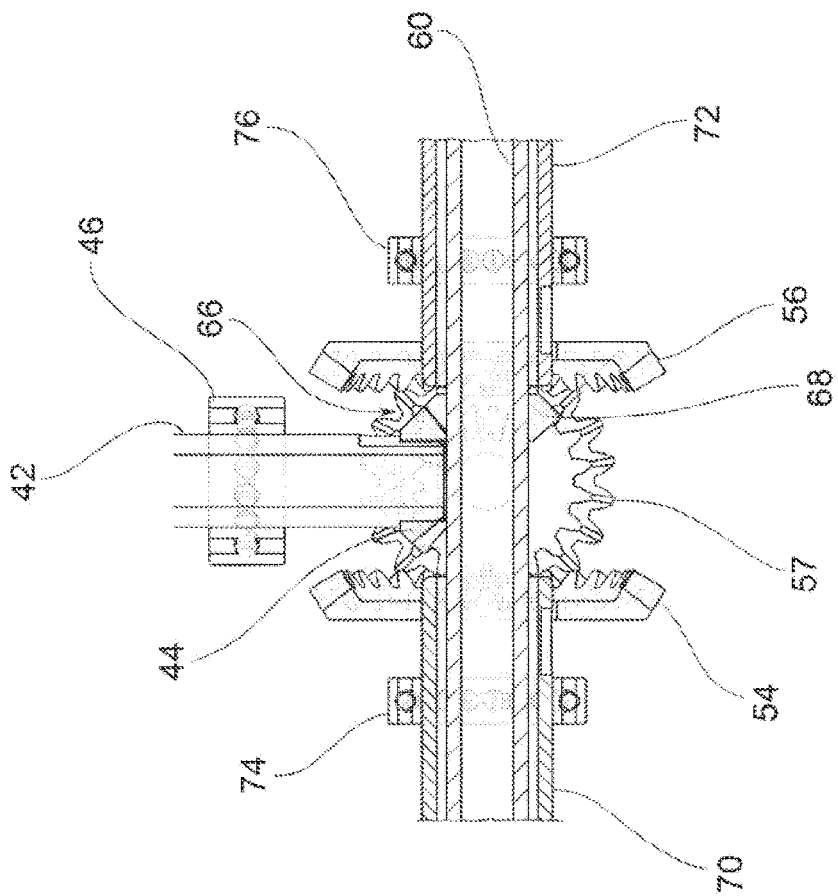
FIG. 9 schematically shows a longitudinal section of a portion of a differential for a vehicle according to the present invention.
Figure 8:
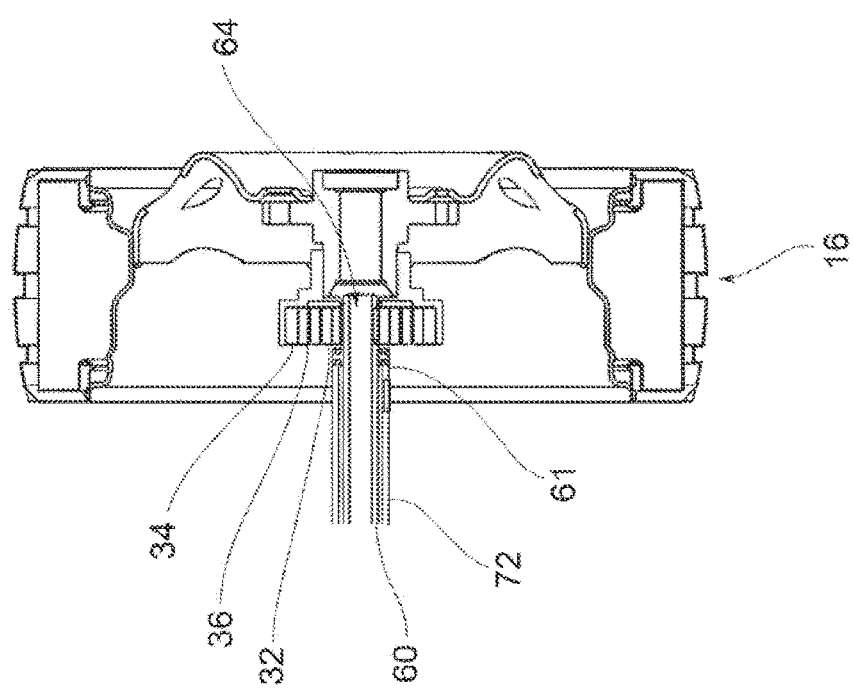
FIG. 8 schematically shows a longitudinal section of a portion of a differential for a vehicle according to the present invention.
Figure 10:
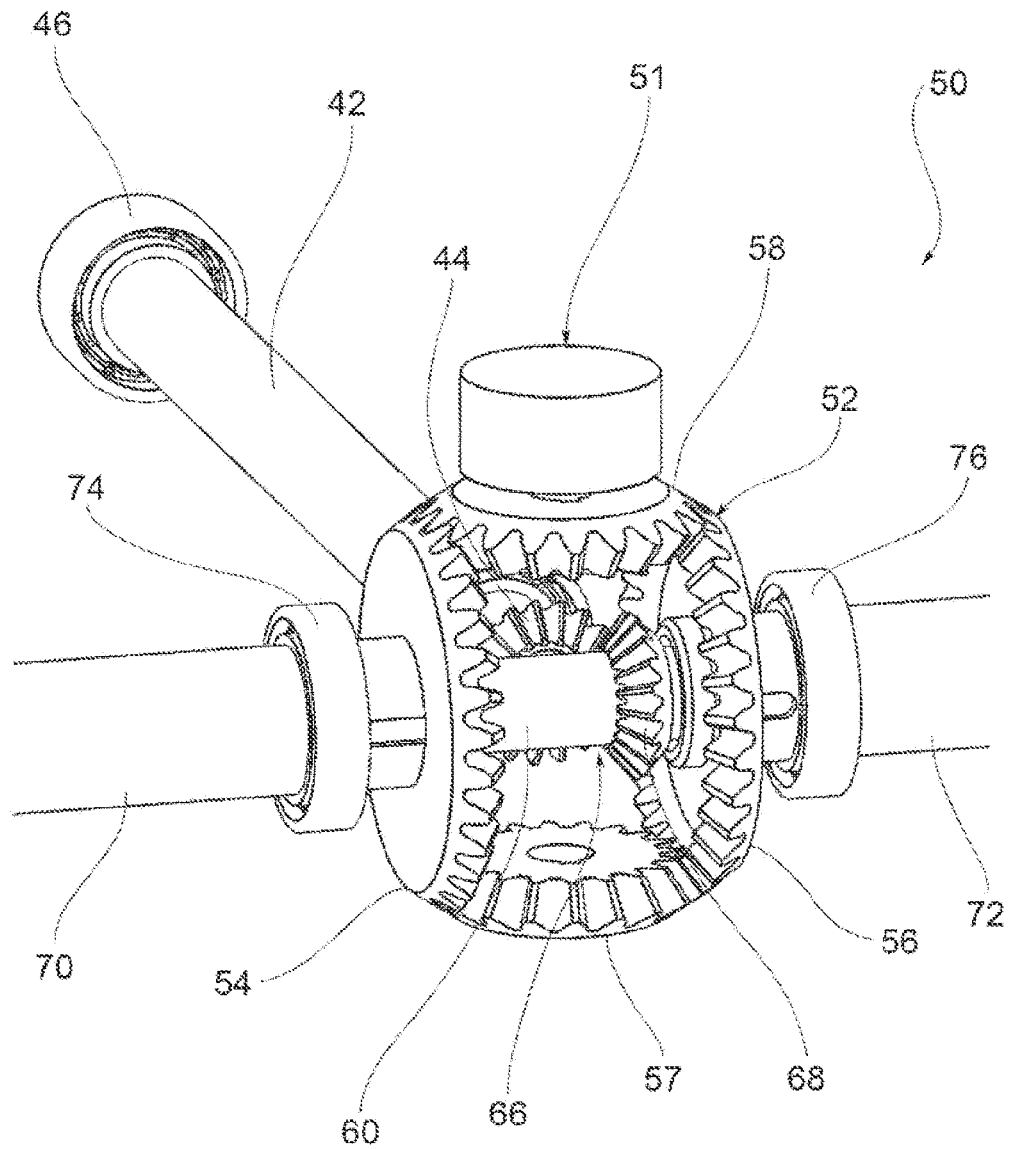
FIG. 10 schematically shows a perspective view of a portion of a differential for a vehicle according to the present invention.

As can be seen in FIG. 9, the first and second rotor shaft of the ferromagnetic poles 70, 72 can be hollow and inside them the shaft of the internal rotors 60 can be housed.

In this regard, bearings 74, 76 can be provided to support the rotation of the first and second rotor shaft of the ferromagnetic poles 70, 72.

Assuming that the same load is applied to the two output semi-axes 25, 35 and that a driving torque is applied to a motor shaft 42, the torques transferred to the output semi-axes 25, 35 are the same. This condition represents a straight-line motion situation in which both wheels have the same grip.

Figure 4:
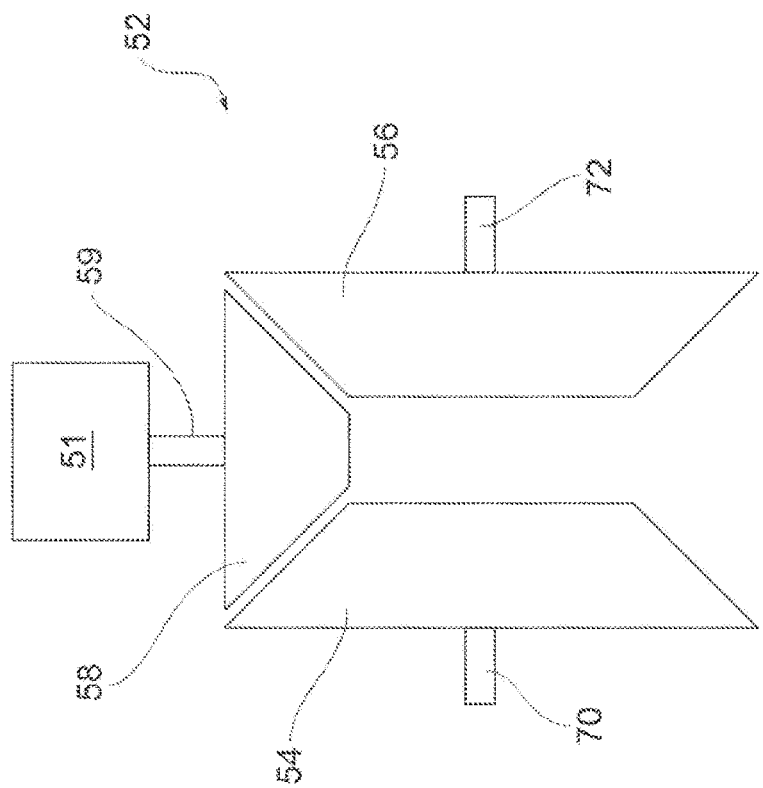
FIG. 4 schematically shows a second embodiment of the component of FIG. 3.
Figure 3:
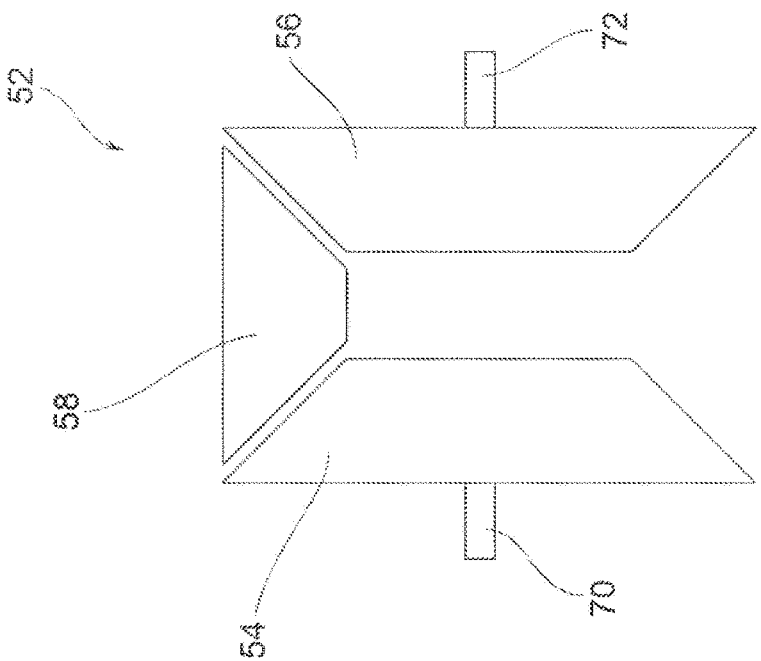
FIG. 3 schematically shows a component of the differential for a vehicle according to the present invention.

In this situation, the rotors of the ferromagnetic poles 26, 36 rotate at the same speed and, with reference to the embodiment shown in FIG. 4, the adjustment shaft 59 does not rotate about its own axis.

In the case of a trajectory of the vehicle on a bend or of different adhesion coefficients on the two wheels, the rotors of the ferromagnetic poles 26, 36 rotate at different speeds to each other. The adjustment conical gear wheel 58, and therefore the adjustment shaft 59, rotate because they are subjected to a non-zero resulting torque.

The rotation of the ferromagnetic poles 26, 36 therefore causes the variation of the reduction ratio of the two magnetic gears 20, 30 which transmit torque to the two output semi-axes 25, 35 rotating at different speeds.

Since the wheels 14, 16 are coupled with the road, the interaction between the wheels and the road guarantees an intrinsic steering capacity limited by grip.

In this case, during a bend, when the system tends to become unstable, that is when the operation of the magnetic gears tends to become asynchronous, and therefore the angular speed of the rotor of the ferromagnetic poles 26, 36, tends to increase, the adjustment means 50 are activated.

The system allows adjusting, in a controlled manner, the rotor speed of the ferromagnetic poles 26, 36 with a device 51 which can be a brake.

The value of the moment that must be applied to ensure stable operation of the system can be easily calculated starting from the design conditions, by adjusting the limit rotation speed of the ferromagnetic pole rotors.

In the simplifying hypothesis of resistant torques linearly dependent on the speed of rotation of the wheels, it is possible to adopt the classical methods of analysis of automatic controls based on the concept of transfer function. In the real case, the motion resistance can have a component that depends on the square of the speed, torque contribution that makes the system not directly analysable by transfer functions. On the basis of the aforementioned simplifications, the system of differential equations which regulates the motion of the transmission shown in FIG. 1, neglecting the torque ripple, electromagnetic losses and saturation, is as follows:

$$\begin{cases} J_i \frac{d^2\theta_i}{dt^2} + b_i \frac{d\theta_i}{dt} = T_i - \frac{P_i}{P_o} T_M (\sin\theta_{e1} + \sin\theta_{e2}) \\ J_{o1} \frac{d^2\theta_{o1}}{dt^2} + b_{o1} \frac{d\theta_{o1}}{dt} = T_{o1} - T_M (\sin\theta_{e1}) \\ J_{o2} \frac{d^2\theta_{o2}}{dt^2} + b_{o2} \frac{d\theta_{o2}}{dt} = T_{o2} - T_M (\sin\theta_{e2}) \\ J_s \frac{d^2\theta_s}{dt^2} + b_i \frac{d\theta_s}{dt} = T_s + \frac{n_s}{P_o} T_M (\sin\theta_{e1} - \sin\theta_{e2}) \\ \theta_{e1} = P_o \theta_{o1} + P_i \theta_i - n_s \theta_s \\ \theta_{e2} = P_o \theta_{o2} + P_i \theta_i + n_s \theta_s \end{cases}$$

Where:
$J_i$, $b_i$, $T_i$, $P_i$ are respectively: moment of inertia, friction coefficient (with friction torque linearly dependent on speed), externally applied mechanical torque and number of poles of internal rotors 22 and 32;
$J_s$, $b_s$, $T_s$ and $n_s$ are respectively moment of inertia, friction coefficient, external torque and number of poles of intermediate rotors 26 and 36;
$J_{o1}$, $b_{o1}$, $T_{o1}$ and $P_o$ are respectively moment of inertia, friction coefficient, external torque and number of poles of the rotor 24;
$J_{o2}$, $b_{o2}$, $T_{o2}$ and $P_o$ are respectively moment of inertia, friction coefficient, external torque and number of poles of the rotor 34;
$T_M$ represents the maximum transmission capacity of each magnetic gear 20 and 30, calculated using electromagnetic simulations or experimentally obtainable;
$\Theta_i$ is the angular position of the rotors 22 and 32 (which are keyed onto the same shaft 60);
$\Theta_{o1}$, $\Theta_{o2}$ are the positions of the rotors 24 and 34;
$\Theta_s$ is the position of the rotor 26, while $-\Theta_s$ is the position of the rotor 36, coinciding with that of the rotor 26 but with opposite sign due to the torque inverter 50.

For purely indicative and non-limiting purposes, below are some numerical values that can take the parameters indicated in the system.

$J_i$=0.1 kgm$^2$
$b_i$=0.01 Nms/rad
$J_{o1}$=6 Kgm$^2$
$b_{o1}$=0.6 Nms/rad
$J_{o2}$=6 kgm$^2$
$b_{o2}$=0.6 Nms/rad
$J_s$=0.1 kgm$^2$
$b_s$=0.3 Nms/rad
$T_M$=100 Nm
$P_i$=3
$P_o$=10
$n_s$=13
$G$=−10/3=−3.33

Taking into account the differential system mentioned above and the hypothesized parameters, a possible operating condition of the differential will be described.

First, a torque step is provided at the time t=0 s of $T_i$=43 Nm while the torques $T_{o1}$, $T_{o2}$, $T_m$ are null (in fact, a load torque included in the coefficients b is envisaged).

At the time t=50 s, a resistant torque is applied to the rotor 34, $T_{o2}$=10 Nm; subsequently this torque is removed at t=70 s. This torque can be imagined as the braking torque applied to the wheel 16, so as to make a bend of the vehicle towards the right. The speed of the wheel 16 must therefore decrease while that of the rotor 24 is established by the transmission so as to satisfy the system of differential equations mentioned above.

When the torque step is removed (at t=70 s it is assumed that the rectilinear motion of the vehicle is restored) the rotors must return to equilibrium condition.

In particular, when the resisting torque is applied to the rotor 34, its speed decreases, ensuring a speed jump with respect to the other undisturbed rotor 24 which depends on the braking torque and the mechanical parameters reported above. When the torque disturbance has finished, the rotor 34 accelerates back to the equilibrium of the rotor 24.

The proposed solution, which includes two coaxial magnetic gears, offers the possibility of restoring the synchronism of the output shafts in analogy to the differential blocking mode in mechanical transmissions.

Moreover, as reported above, the known solutions for the prevention of pitch loss focus on PDDs, i.e. on electric motors with an integrated magnetic gear, while the solution discussed uses a gear composed of only permanent magnets.

The magnetic differential of the present invention allows the active intervention on the traction in an independent manner on the two outgoing mechanical axes overcoming the actuation logic used in the normal traction controls, which provides the control carried out by applying braking torques.

The device is compact and robust thanks to the structure that uses only two magnetic gears and a mechanical gear.

Moreover, the magnetic differential of the present invention offers a control of the stability of the device in case of loss of pitch, with the possibility of implementing the differential lock with active logics that can be integrated with dedicated sensors. This feature is delegated, for example, to a conventional mechanical brake which acts on the rotor of the ferromagnetic poles. The power linked to these braking torques could be used by a servo system as a source of energy recovery or power input to be distributed in a differential manner.

The transmission has no components for lubrication and offers an intrinsic protection in the event of torque overload. This feature is typical of magnetic transmissions which have the ability to lose pace in the event of excessive torque without causing mechanical damage. It is therefore not necessary to provide a friction member in the transmission chain.

The transmission can therefore operate without particular temperature limitations as opposed to mechanical differentials in which the lubricating oil tends to thicken at low temperatures.

Furthermore, the absence of windings and external power supply systems increases the solidity and operability of the device.

Again, as shown by electromagnetic analyzes in the literature, the system has a high conversion efficiency and allows the possibility of arbitrarily choosing the transmission reduction ratio. In particular, the efficiency decreases with the increase of the rotation speed (due to the losses in the iron which increase more than linearly with the frequency). This guarantees particularly high efficiency values in high torque and low speed applications.

Moreover, the differential of the present invention can be integrated with active control systems already present for the dynamics of the vehicle and for increasing safety with new possible strategies for correcting torque modulation on the driving wheels.

The system guarantees reduced vibrations and extended life compared to the mechanical counterpart due to the absence of direct contact between the moving parts. A characteristic feature of magnetic gears is the absence of contact between the input and output shafts thanks to the electromagnetic transmission of the torque. In the proposed differential, the rotor connected to the iron poles is stopped in the case of equilibrium of the two output rotors (vehicle in rectilinear motion), therefore the number of revolutions of the mechanical gear (with transmission ratio −1) in the operating life is reduced compared to the case of mechanical differential gear where, for example, in straight motion, the axes of the planetary gears are fixed in space but the gears rotate (with consequent wear due to meshing). This feature requires a greater fatigue life of the component compared to a mechanical differential, with the same torque, thanks to the reduced number of cycles to which the component is subjected.

A man skilled in the art may make several changes and/or replacements of elements described with equivalent elements to the embodiments described above in order to meet specific needs, without departing from the scope of the appended claims.

For example, it is possible to use magnetic gears in which the various rotors are side by side and coaxial with one another.

The invention claimed is:

1. A differential comprising two magnetic gears, each of said magnetic gears comprising:
    an internal rotor comprising permanent magnets and having polar pairs,
    an external rotor comprising permanent magnets and having polar pairs, and
    a rotor of ferromagnetic poles interposed between said internal rotor and said external rotor;
    said internal rotor, said external rotor and said rotor of the ferromagnetic poles being coaxial and configured for rotating about a gear axis; wherein:
    the internal rotors are configured for being connected to a drive, to be placed in rotation about a respective gear axis by said drive;
    the external rotors are configured for being connected to respective output axle shafts for placing them in rotation or are connected to adjustment means configured for adjusting their rotation speed;
    in an event that the external rotors are configured for being connected to the respective output axle shafts for placing them in rotation, the rotors of the ferromagnetic poles are connected to the adjustment means configured for adjusting the rotation speed of said rotors of the ferromagnetic poles;
    in an event that the external rotors are connected to the adjustment means configured for adjusting their rotation speed, the rotors of the ferromagnetic poles are configured for being connected to the respective output axle shafts for placing them in rotation;
    the polar pairs of said internal rotor, the polar pairs of said external rotor, and the ferromagnetic poles are selected to achieve a predetermined gear reduction.

2. The differential of claim 1, wherein said adjustment means comprise a connecting gear having a first gear wheel integral in rotation with the rotor of the ferromagnetic poles of one of said magnetic gears and a second gear wheel integral in rotation with the rotor of the ferromagnetic poles of the other of said magnetic gears; said connecting gear having a transmission ratio of −1 between said first gear wheel and said second gear wheel.

3. The differential of claim 2, wherein said first gear wheel and said second gear wheel are conical, said connecting gear further comprising a conical adjustment gear wheel interposed between and meshing with said first gear wheel and said second gear wheel.

4. The differential of claim 3, wherein said adjustment means comprise a device for increasing or decreasing the rotation speed of said conical adjustment gear wheel.

5. The differential of claim 4, wherein said device for decreasing the rotation speed of said conical adjustment gear wheel is a brake.

6. The differential of claim 4, wherein said device for decreasing or increasing the rotation speed of said conical adjustment gear wheel is a drive motor.

7. The differential of claim 2, wherein said adjustment means comprise sensors for detecting particular operating conditions of the magnetic gears.

8. The differential of claim 1, further comprising an internal rotor shaft having a first end and a second end, on which said internal rotors are keyed; in an intermediate position between said first and second ends there is a coupling means being arranged with said drive to transfer rotation movement of a motor shaft of said drive to said internal rotor shaft.

9. The differential of claim 1, further comprising a first rotor shaft and a second rotor shaft of the ferromagnetic poles, each rotor shaft having a respective rotor of the ferromagnetic poles keyed to one end and at another end one of first and second gear wheels of a connecting gear.

10. The differential of claim 9, wherein said first and second rotor shafts of the ferromagnetic poles are hollow, and wherein an internal rotor shaft is housed inside said first and second rotor shafts.

11. A vehicle comprising the differential according to claim 1.

12. The differential of claim 1, wherein said internal rotor, said external rotor and said rotor of the ferromagnetic poles are concentric.

* * * * *